US012619244B2

(12) United States Patent
    Cozza

(10) Patent No.: US 12,619,244 B2
(45) Date of Patent: May 5, 2026

(54) SYSTEM AND METHOD FOR AUTONOMOUS SURVEILLANCE OF AN AGRICULTURAL MACHINE

(71) Applicant: CNH Industrial America LLC, New Holland, PA (US)

(72) Inventor: Michael R. Cozza, Pittsburgh, PA (US)

(73) Assignee: CNH Industrial America LLC, New Holland, PA (US)

( * ) Notice: Subject to any disclaimer, the term of this patent is extended or adjusted under 35 U.S.C. 154(b) by 169 days.

(21) Appl. No.: 18/105,624

(22) Filed: Feb. 3, 2023

(65) Prior Publication Data

US 2024/0264601 A1 Aug. 8, 2024

(51) Int. Cl.
G05D 1/00 (2024.01)
A01B 69/04 (2006.01)
(Continued)

(52) U.S. Cl.
CPC ........... G05D 1/106 (2019.05); A01B 69/008 (2013.01); B64C 39/024 (2013.01); H04W 4/46 (2018.02);
(Continued)

(58) Field of Classification Search
CPC .... G05D 1/106; A01B 69/008; A01B 69/001; B64C 39/04; H04W 4/46; B64U 2101/26;
(Continued)

(56) References Cited

U.S. PATENT DOCUMENTS 8,909,389 B2 12/2014 Meyer
9,776,717 B2 10/2017 Spinelli et al.
(Continued)

FOREIGN PATENT DOCUMENTS

DE 102016202627 A1 8/2017

OTHER PUBLICATIONS

"Agriculture Drone" 2019 Companies & Service Providers Postscapes Jul. 19, 2019 (20 pages) https://postscapes.com/agriculture-drone-companies/.

(Continued)

*Primary Examiner* — Fadey S. Jabr
*Assistant Examiner* — Paula L Schneider
(74) *Attorney, Agent, or Firm* — Dority & Manning, P.A.

(57) ABSTRACT

In one aspect, an agricultural surveillance platform useful to identify an operating condition of an agricultural machine may include an autonomous sensor frame structured to fly in formation with an agricultural machine and detect an operating condition of the agricultural machine. The agricultural surveillance platform may include a propulsion system to provide propulsive power to the autonomous sensor frame, and an inertial measurement unit configured to generate flight data measurements. The agricultural surveillance platform may also include an object detection sensor having a field of view sized to capture an image scene that includes the agricultural machine and generate scene data representing the image scene. The agricultural surveillance platform may also include a sensor frame controller configured to maintain a position of the autonomous sensor frame about (Continued)

158

160 —
Formation flying an autonomous sensor frame based on an agricultural machine 162 —
Capturing an image scene with an object detection sensor and generating scene data representing the image scene, the image scene including at least part of the agricultural machine 164 —
Generating sensor frame data from the autonomous sensor frame that includes plugged data indicative of a plugged operating condition of the agricultural machine, the plugged data based on the scene data 166 —
Transmitting the sensor frame data that includes the plugged data from the autonomous sensor frame to the agricultural machine 168 —
Altering a state of operation of the agricultural machine based on the plugged data the agricultural machine and generate autonomous sensor frame data that includes plugged data indicative of a plugged operating condition of the agricultural machine.

20 Claims, 7 Drawing Sheets

(51) Int. Cl.

| | |
|---|---|
| *B64C 39/02* | (2023.01) |
| *B64U 101/26* | (2023.01) |
| *B64U 101/31* | (2023.01) |
| *B64U 101/40* | (2023.01) |
| *H04W 4/46* | (2018.01) |

(52) U.S. Cl.
CPC ...... *B64U 2101/26* (2023.01); *B64U 2101/31* (2023.01); *B64U 2101/40* (2023.01); *B64U 2201/10* (2023.01)

(58) Field of Classification Search
CPC .... B64U 2101/312101; B64U 2101/40; B64U 2201/10; B64U 2101/33; B64U 2101/30; B64U 2101/31
USPC .......................................................... 701/3
See application file for complete search history.

(56) References Cited

U.S. PATENT DOCUMENTS

| | | | | |
|---|---|---|---|---|
| 10,189,568 | B2 | 1/2019 | O'Connor et al. | |
| 10,322,803 | B2 | 6/2019 | Flood et al. | |
| 12,127,075 | B2* | 10/2024 | Zhao | G08G 5/0052 |
| 2016/0363932 | A1* | 12/2016 | Moriarity | G07C 5/00 |
| 2017/0031365 | A1* | 2/2017 | Sugumaran | G05D 1/0219 |
| 2017/0112043 | A1 | 4/2017 | Nair et al. | |
| 2018/0129879 | A1* | 5/2018 | Achtelik | G01C 5/00 |
| 2018/0338422 | A1* | 11/2018 | Brubaker | A01D 41/1208 |
| 2019/0055015 | A1 | 2/2019 | Allard et al. | |
| 2019/0114847 | A1 | 4/2019 | Wagner et al. | |
| 2019/0378423 | A1* | 12/2019 | Bachrach | H04L 67/12 |
| 2023/0094319 | A1* | 3/2023 | Hansen | A01B 69/008 |
| | | | | 701/50 |

OTHER PUBLICATIONS

Jeremy Jensen "Agricultural Drones: How Drones Are Revolutionizing Agriculture and How to Break into this Booming Market" Apr. 18, 2019 (13 pages) https://navcoach.com/agricultural-drones/.

\* cited by examiner

148

Computing System

Processor(s) — 150

Memory Device(s) — 152

Communication Module(s) — 154

156

Object Detection Sensor — 114

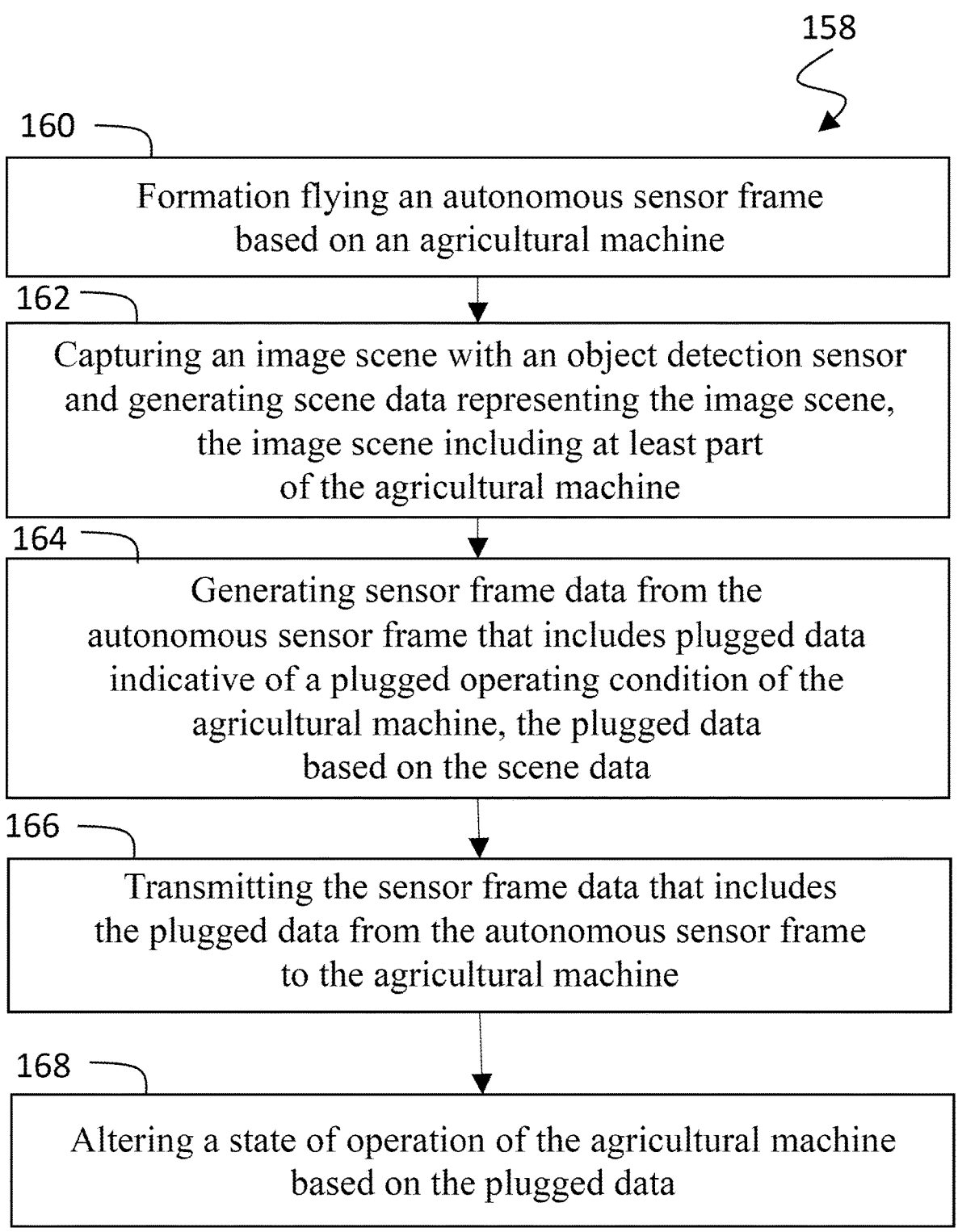

158

160
Formation flying an autonomous sensor frame
based on an agricultural machine 162
Capturing an image scene with an object detection sensor
and generating scene data representing the image scene,
the image scene including at least part
of the agricultural machine 164
Generating sensor frame data from the
autonomous sensor frame that includes plugged data
indicative of a plugged operating condition of the
agricultural machine, the plugged data
based on the scene data 166
Transmitting the sensor frame data that includes
the plugged data from the autonomous sensor frame
to the agricultural machine 168
Altering a state of operation of the agricultural machine
based on the plugged data

FIG. 7

SYSTEM AND METHOD FOR AUTONOMOUS SURVEILLANCE OF AN AGRICULTURAL MACHINE

FIELD OF THE INVENTION

The present disclosure generally relates to surveillance of agricultural machines and, more particularly, to systems and methods for autonomous surveillance of an agricultural machine to detect a plugged condition, such as a plugged condition of an implement used in the machine.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more ground engaging components configured to rotate relative to the soil as the implement is moved across the field. For example, in certain configurations, the implement may include one or more harrow discs, leveling discs, rolling baskets, and/or the like. Such rotating ground engaging component(s) loosen and/or otherwise agitate the soil to prepare the field for subsequent planting operations.

During tillage operations, field materials, such as residue, soil, rocks, and/or the like, may become trapped or otherwise accumulate between adjacent rotating ground engaging components. Such accumulations of field materials may inhibit the operation of the rotating ground engaging components in a manner that prevents the components from providing adequate tillage to the field. In such instances, it is necessary for the operator to take certain corrective actions to remove the accumulated field materials. However, it may be difficult for the tillage implement operator to determine when field materials have accumulated between the rotating ground engaging components.

Accordingly, an improved system and method for detecting accumulations of field materials between ground engaging components of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural surveillance platform useful to identify an operating condition of an agricultural machine. The agricultural surveillance platform may include an autonomous sensor frame structured to fly in formation with an agricultural machine and detect an operating condition of the agricultural machine. The agricultural surveillance platform may include a propulsion system structured to provide propulsive power to the autonomous sensor frame. The agricultural surveillance platform may also include an inertial measurement unit configured to generate flight data measurements. The agricultural surveillance platform may further also include an object detection sensor affixed to the autonomous sensor frame and having a field of view sized to capture an image scene that includes the agricultural machine, the object detection sensor structured to generate scene data representing the image scene. The agricultural surveillance platform may still further also include a sensor frame controller configured to receive the flight data measurements and generate a control command useful to modulate the propulsion system and maintain a position of the autonomous sensor frame about the agricultural machine. The sensor frame controller can be configured to receive the scene data and generate autonomous sensor frame data that includes plugged data indicative of a plugged operating condition of the agricultural machine.

In another aspect, the present subject matter is directed to an agricultural surveillance system. The agricultural surveillance system may include an autonomous sensor frame configured to navigate around an agricultural machine. The autonomous sensor frame may include a propulsion system for providing propulsive power to the autonomous sensor frame. The autonomous sensor frame may also include an object detection sensor having a field of view sized to capture an image scene that includes the agricultural machine. The object detection sensor may be structured to generate a scene data representing the image scene. The autonomous sensor frame may also include a sensor frame controller configured to receive the scene data and generate an autonomous sensor frame data that includes a plugged data indicative of a plugged operating condition of the agricultural machine. The autonomous sensor frame may also include an autonomous sensor frame transceiver structured to transmit the autonomous sensor frame data that includes the plugged data upon command of the sensor frame controller. The agricultural machine can be configured to work a soil. The agricultural machine may include an agricultural machine transceiver structured to receive the autonomous sensor frame data that includes the plugged data from the autonomous sensor frame. The agricultural machine may also include an agricultural machine controller configured to alter a state of operation of the agricultural machine based on the plugged data.

In a further aspect, the present subject matter is directed to a method of operating an agricultural surveillance system. The method may include formation flying an autonomous sensor frame based on an agricultural machine. The method may further include capturing an image scene with an object detection sensor and generating scene data representing the image scene, the image scene including at least part of the agricultural machine. The method may further include generating sensor frame data from the autonomous sensor frame that includes plugged data indicative of a plugged operating condition of the agricultural machine, the plugged data based on the scene data. The method may still further include transmitting the sensor frame data that includes the plugged data from the autonomous sensor frame to the agricultural machine. The method may still further include altering a state of operation of the agricultural machine based on the plugged data.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 7 illustrates a flow diagram of one embodiment of a method for operating an agricultural surveillance system in accordance with aspects of the present subject matter.

Figure 1:
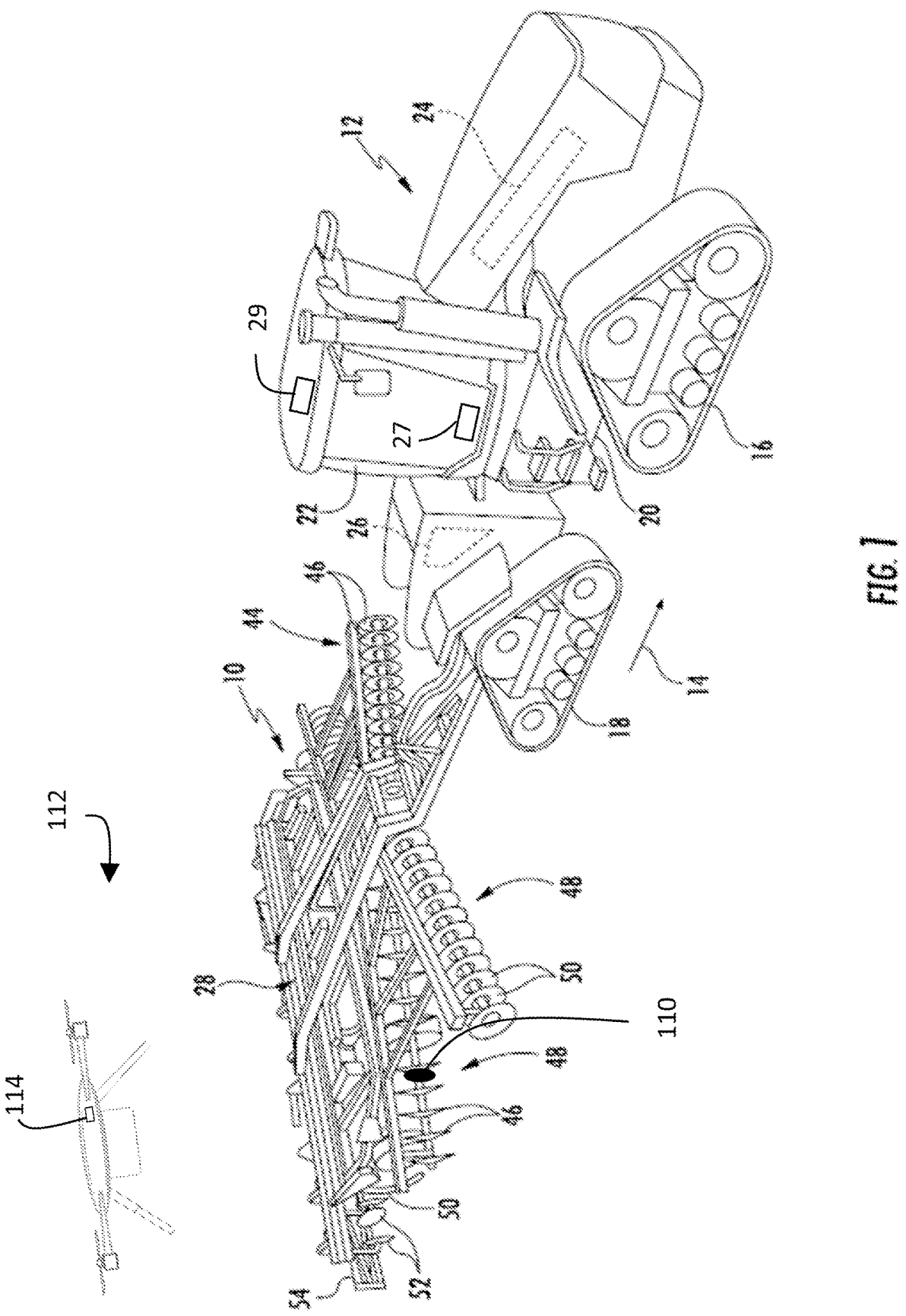
FIG. 1 illustrates a perspective view of one embodiment of an agricultural implement coupled to a work vehicle forming an agricultural machine in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for detecting accumulations of field materials between ground engaging components of an agricultural implement. Specifically, in several embodiments, an autonomous sensor frame can be used to fly in formation with an agricultural machine, such as a machine that includes a work vehicle and an implement. The autonomous sensor frame can fly alongside the agricultural machine and assess whether field materials have accumulated in the implement to create a plugged condition. The autonomous sensor frame can fly any variety of guidance paths around the agricultural machine in performing the assessment. An object detection sensor on board the autonomous sensor frame can be used to capture scene data from an image scene as it determines whether a plugged condition exists in the agricultural machine. In one embodiment the autonomous sensor frame communicates sensor frame data, including a determination of a plugged condition to the agricultural machine. The sensor frame data can include a likelihood and severity of a plugged condition based upon its evaluation of scene data from the object detection sensor. The agricultural machine controller can halt operation of the agricultural machine if the sensor frame data includes a plugged condition that exceeds a threshold. In some embodiments, the autonomous sensor frame can be dispatched from one agricultural machine after flying formation to surveil for a plugged condition to another agricultural machine to fly a subsequent formation and surveil for a plugged condition on the other agricultural machine.

Figure 2:
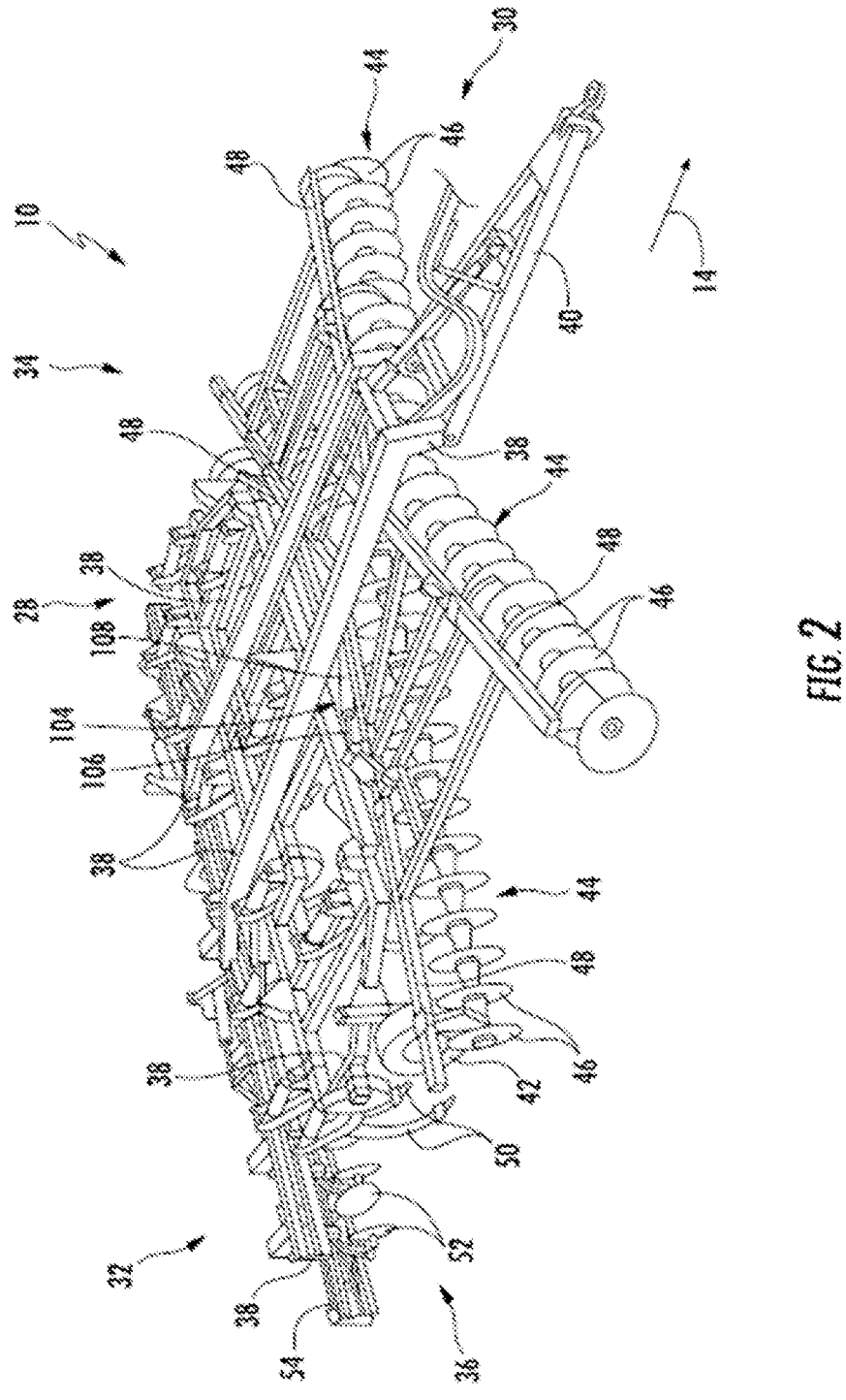
FIG. 2 illustrates an alternative perspective view of an agricultural implement in accordance with aspects of the present subject matter, particularly illustrating various components of the implement in accordance with aspects of the present subject matter.

Referring now to drawings, FIGS. 1 and 2 illustrate various views of one embodiment of an agricultural machine 13 in accordance with aspects of the present subject matter. As shown, in the illustrated embodiment, the agricultural machine 13 is configured to include either or both of an agricultural work vehicle 12 (sometimes referred to herein as a 'work vehicle' or simply 'vehicle' for ease of reference) and an agricultural implement 10 (sometimes referred to herein as an 'implement' for ease of reference) coupled to the vehicle 12.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices for permitting an operator to control the operation of one or more components of the work vehicle 12 and/or one or more components of the implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

The agricultural machine 13 may also include an agricultural machine controller 27 useful to alter a state of operation of the agricultural machine, as well as an agricultural machine transceiver 29 which can be used to receive information relevant to the operation of the agricultural machine 13. In one form, the agricultural machine controller 27 has full authority and can control engine and steering operation in an autonomous fashion, but not all embodiments are contemplated as being autonomous. For example, the agricultural machine controller 27 can throttle the engine 24 to reduce a power output and/or can command the engine 24 and transmission 26 to bring the agricultural machine 13 to a stop. In non-autonomous operation, the agricultural machine controller 27 can provide indications to an operator in the cab 22 through any suitable display useful to alter an operation of the agricultural machine 13. Such indications could include a warning light or audible sound to reduce speed of the agricultural machine 13. The agricultural machine controller 27 can be in communication with the agricultural machine transceiver 29 such that data received via the agricultural machine transceiver 29 is processed with the agricultural machine controller 27 to alter an operation of the agricultural machine 13. Further examples of such receipt of data via the agricultural machine transceiver 29 and subsequent use in the agricultural machine controller 27 are described further below:

As shown in FIGS. 1 and 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown) may be coupled to the frame 28 to facilitate towing the implement 10 in the direction of travel 14.

In several embodiments, the frame 28 may be configured to support one or more gangs or sets 44 of disc blades 46. Each disc blades 46 may, in turn, be configured to penetrate into or otherwise engage the soil as the implement 10 is being pulled through the field. In this regard, the various disc gangs 44 may be oriented at an angle relative to the direction of travel 14 to promote more effective tilling of the soil. In the embodiment shown in FIGS. 1 and 2, the implement 10 includes four disc gangs 44 supported on the frame 28 adjacent to its forward end 30. However, it should be appreciated that, in alternative embodiments, the implement 10 may include any other suitable number of disc gangs 44, such as more or fewer than four disc gangs 44. Furthermore, in one embodiment, the disc gangs 44 may be mounted to the frame 28 at any other suitable location, such as adjacent to its aft end 32.

Moreover, in several embodiments, the implement 10 may include a plurality of disc gang actuators 104 (one is shown), with each actuator 104 being configured to move or otherwise adjust the orientation or position of one of the disc gangs 44 relative to the implement frame 28. For example, as shown in the illustrated embodiment, a first end of each actuator 104 (e.g., a rod 106 of the actuator 104) may be coupled to a support arm 48 of the corresponding disc gang 44, while a second end of each actuator 104 (e.g., the cylinder 108 of the actuator 104) may be coupled to the frame 28. The rod 106 of each actuator 104 may be configured to extend and/or retract relative to the corresponding cylinder 108 to adjust the angle of the corresponding disc gang 44 relative to a lateral centerline (not shown) of the frame 28 and/or the penetration depth of the associated disc blades 46. In the illustrated embodiment, each actuator 104 corresponds to a fluid-driven actuator, such as a hydraulic or pneumatic cylinder. However, it should be appreciated that each actuator 104 may correspond to any other suitable type of actuator, such as an electric linear actuator.

Additionally, as shown, in one embodiment, the implement frame 28 may be configured to support other ground engaging tools. For instance, in the illustrated embodiment, the frame 28 is configured to support a plurality of shanks 50 configured to rip or otherwise till the soil as the implement 10 is towed across the field. Furthermore, in the illustrated embodiment, the frame 28 is also configured to support a plurality of leveling blades 52 and rolling (or crumbler) basket assemblies 54. However, in other embodiments, any other suitable ground-engaging tools may be coupled to and supported by the implement frame 28, such as a plurality closing discs.

During a soil working operation, field materials (e.g., soil, residue, rocks, and/or the like) may accumulate between components on the agricultural machine which impede a working operation of the components. Examples of components that can become fouled by an excessive accumulation of field materials includes one or more of disc blades 46, shanks 50, wheels 42, blades 52, and/or basket assemblies 54. In some situations, the accumulation of field materials may build to a level leading to undesirable performance of the implement 10 that can include the dragging of materials through a field and the creation of furrows or other undesirable field surface features behind the agricultural machine as a result. A determination of undesirable field surface features can be made based on an assessment of the uniformity, soil roughness, and furrows of a certain height left behind after passage of the implement 10. Data from an object detection sensor (e.g., object detection sensor 114 described further below) can be compared against a baseline to determine deviations in uniformity, soil roughness, and furrows of a certain height. Deviations beyond a threshold can be used to determine the severity or likelihood of a plugged condition. A situation in which an excessive accumulation of field materials in any one or more components creates a plugged condition 110 illustrated in FIG. 1. Though the embodiment in FIG. 1 illustrated a plugged condition between disc blades 46, it will be appreciated that analogous plugged conditions 110 are applicable to any of the other components.

Also illustrated in FIG. 1 is an autonomous sensor frame 112 useful to fly alongside the agricultural machine 13 to aid in determining whether a plugged condition exists with respect to the agricultural machine 13. The autonomous sensor frame 112 can include an object detection sensor 114 useful to capture an image scene that includes the agricultural machine 13, and then generate scene data representing the image scene. As will be discussed further herein, the autonomous sensor frame 112 can be used to fly formation alongside the agricultural machine 13 in any useful set position or pattern and can be used to fly formation in a dynamic manner such that the position and/or pattern can be updated by an operator and/or updated as a result of changing conditions in which the autonomous sensor frame 112 is capturing scene data of the image scene. An example of a changing condition includes the avoidance of obstacles, such as fences, houses, etc., or the avoidance of changing environmental conditions, such as the formation and/or persistence of dust clouds.

The object detection sensor 114 can take any variety of forms useful to capture an image scene, including a camera, LiDAR sensor, radar system, ultrasonic sensor, etc. In the form of a camera, such object detection sensor 114 can be 2-D or 3-D camera. The camera can capture images in a variety of wavelengths, including visible wavelengths, near infrared, and infrared. The cameras can also capture images at a variety of resolutions. In some forms, the cameras can capture still images while in others the cameras can capture moving images at a variety of frame rates. In short, the camera can take on a variety of forms. In the form of a light detection and ranging (LiDAR) system, such object detection sensor 114 can generate point cloud data useful in providing ranging or distance information to points or objects with the dataset. The LiDAR can have any variety of resolution, frame rates, and viewing angles. In the form of a radar system, the object detection sensor 114 can be capable of detecting radar objects and tracking the objects through time. Any given embodiment of the radar is structured to provide any number of functions and measures, including tracking of objects, distance to or location of objects in a radar frame of reference, Doppler speed, object identification, and a confidence of object identification. The object detection sensor 114 can be fixed stationary to the autonomous sensor frame, but in other embodiments can be mounted to a gimbled platform 115 (see FIG. 3) to aid in providing stability and/or improved vantage points to the object detection sensor 114.

Figure 3:
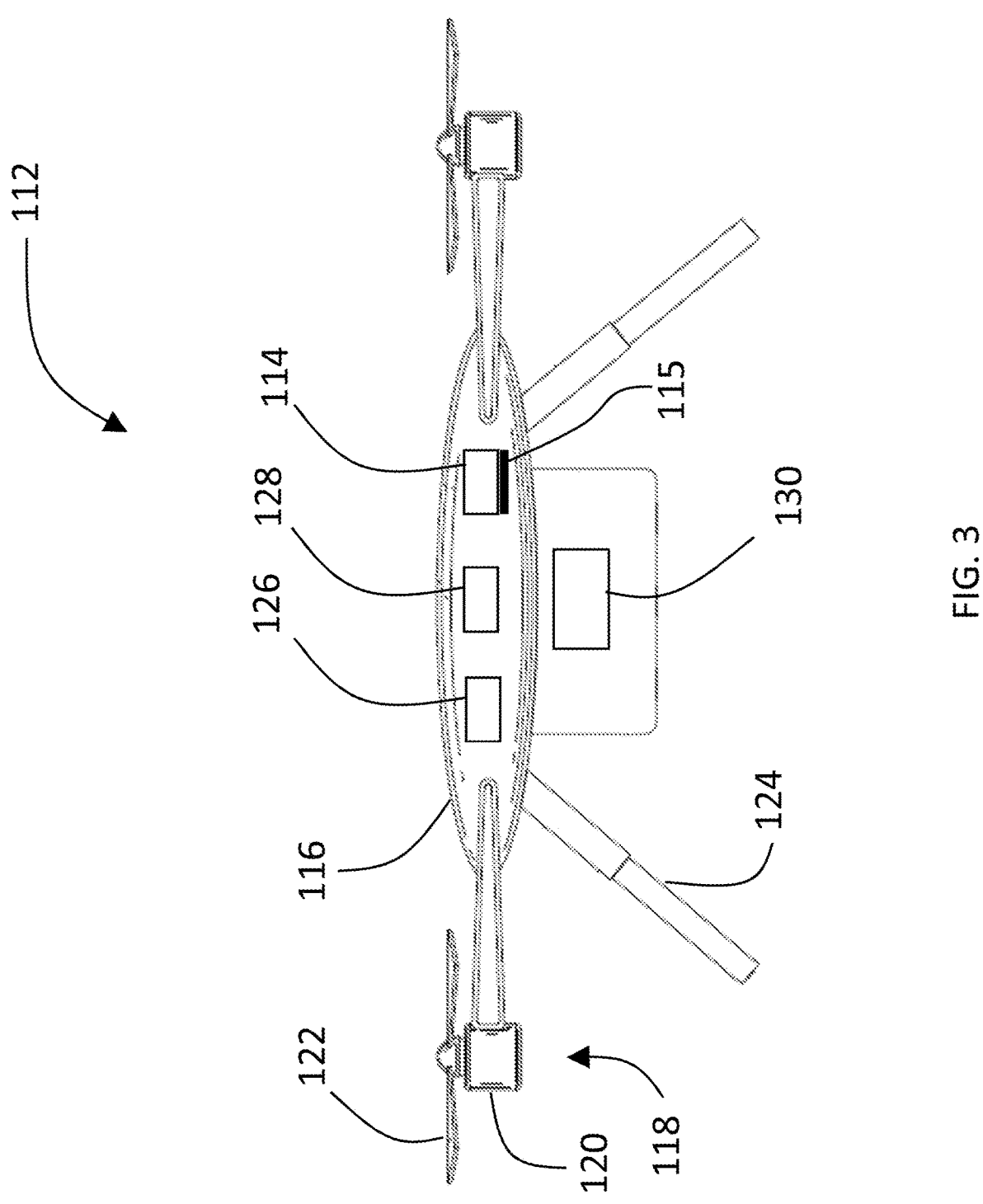
FIG. 3 illustrates a view of an autonomous sensor frame in accordance with aspects of the present subject matter, particularly illustrating various components of the autonomous sensor frame in accordance with aspects of the present subject matter.

FIG. 3 depicts further details of the autonomous sensor frame 112. As shown, in several embodiments, the autonomous sensor frame 112 is configured as an unmanned aerial vehicle (UAV). In such embodiments, the autonomous sensor frame 112 may be configured to be flown over a field (e.g., an agricultural field) and into formation with the agricultural machine 13. As such, the autonomous sensor frame 112 may generally correspond to any suitable aerial vehicle capable of unmanned flight, such as any UAV capable of controlled vertical, or nearly vertical, takeoffs and landings. For example, in the illustrated embodiment, the autonomous sensor frame 112 is configured as a quadcopter. However, in alternative embodiments, the autonomous sensor frame 112 may be configured as any other multi-rotor aerial vehicle, such as a tricopter, hexacopter, or octocopter. In further embodiments, the autonomous sensor frame 112 may be configured as a single-rotor helicopter or a fixed wing, hybrid vertical takeoff and landing aircraft. In still further embodiments, the autonomous sensor frame 112 may be a fixed wing aircraft.

As shown, the autonomous sensor frame 112 may include various components that permit the autonomous sensor frame 112 to be flown to and into formation with the agricultural machine 13. Specifically, in several embodiments, the autonomous sensor frame 112 may include a body or frame 116 that supports a propulsion system 118. For example, in one embodiment, the propulsion system 118 may include four motors 120 (two are shown in FIG. 3), with each motor 120 coupled to the body 116 via a support arm. Each motor 120 may, in turn, be configured to rotationally drive an associated propeller 122. However, in alternative embodiments, the propulsion system 118 may have any other suitable configuration. For example, the propulsion system 118 may include fewer or more than four motors 120 and associated propellers 122.

Furthermore, the autonomous sensor frame 112 may include a plurality of legs 124 configured to support the body 116 when landing. For example, in one embodiment, the autonomous sensor frame 112 may include four legs 124 (two are shown in FIG. 1) extending outward from the body 116. However, in alternative embodiments, the autonomous sensor frame 112 may include any other suitable number of legs 124. Additionally, in several embodiments, the legs 124 may be configured to telescope or otherwise extend and retract in a manner that allows the orientation of the body 116.

The autonomous sensor frame 112 can also include an inertial measurement unit 126, an autonomous sensor frame transceiver 128, and a sensor frame controller 130. The inertial measurement unit 126 may include any variety of sensors useful to measure and/or estimate state information relevant to the flight of the autonomous sensor frame 112. For example, the inertial measurement unit 126 can include accelerometers, rate gyroscopes, and/or angle gyroscopes needed for stability and/or performance. It is contemplated that the inertial measurement unit 126 can include sensors of any type to provide measurements along any of a defined set of axes, such as, but not limited to, three body axes of pitch, roll, and yaw. In addition, any variety of accelerometers and/or gyroscopes are contemplated in the inertial measurement unit 126. In some forms, the inertial measurement unit 126 can additionally provide estimates or other calculated parameters related to a flight condition of the autonomous sensor frame 112. For example, the inertial measurement unit 126 can be configured to integrate sensor measurements to provide the determination of a position of the autonomous sensor frame 112. Any variety of techniques can be used to calculate or estimate additional parameters, including through the use of Kalman filters and the like. In still further forms, the inertial measurement unit 126 can be include and/or be coupled with a magnetometer to measure magnetic heading. Additionally and/or alternatively, the inertial measurement unit 126 can be coupled with a global navigation satellite system (GNSS), such as, but not limited to, a Global Position Satellite (GPS) receiver, to provide position information of the inertial measurement unit 126. Such position and/or heading information can be fused with data from the inertial measurement unit 126 to provide redundancy and/or improved accuracy.

The autonomous sensor frame transceiver 128 is used to wirelessly communicate information to and from the autonomous sensor frame 112 to any other suitable device, such as the agricultural machine transceiver 29 associated with the agricultural machine 13. The autonomous sensor frame transceiver 128 can be used to transmit data related to the plugged condition 110 so that, in one embodiment, the agricultural machine controller 27 can alter an operation of the agricultural machine 13. Additionally, in some embodiments, the autonomous sensor frame transceiver 128 can be configured to receive data from the agricultural machine transceiver 29, such as, but not limited to, a position of the agricultural machine 13. Such position information can be used by the autonomous sensor frame 112 to locate the agricultural machine 13. As will be appreciated, data transmitted and received by either or both of the autonomous sensor frame transceiver 128 and agricultural machine transceiver 29 can be direct bi-directional communication, but in some forms the data can be received and re-transmitted by any suitable intermediate device, such as through a cloud computing service. Thus, no limitation is hereby intended unless expressly required to the contrary that data transmitted and/or received by either of the autonomous sensor frame transceiver 128 and agricultural machine transceiver 29 must be exclusively and directly between the autonomous sensor frame transceiver 128 and agricultural machine transceiver 29.

Figure 4:
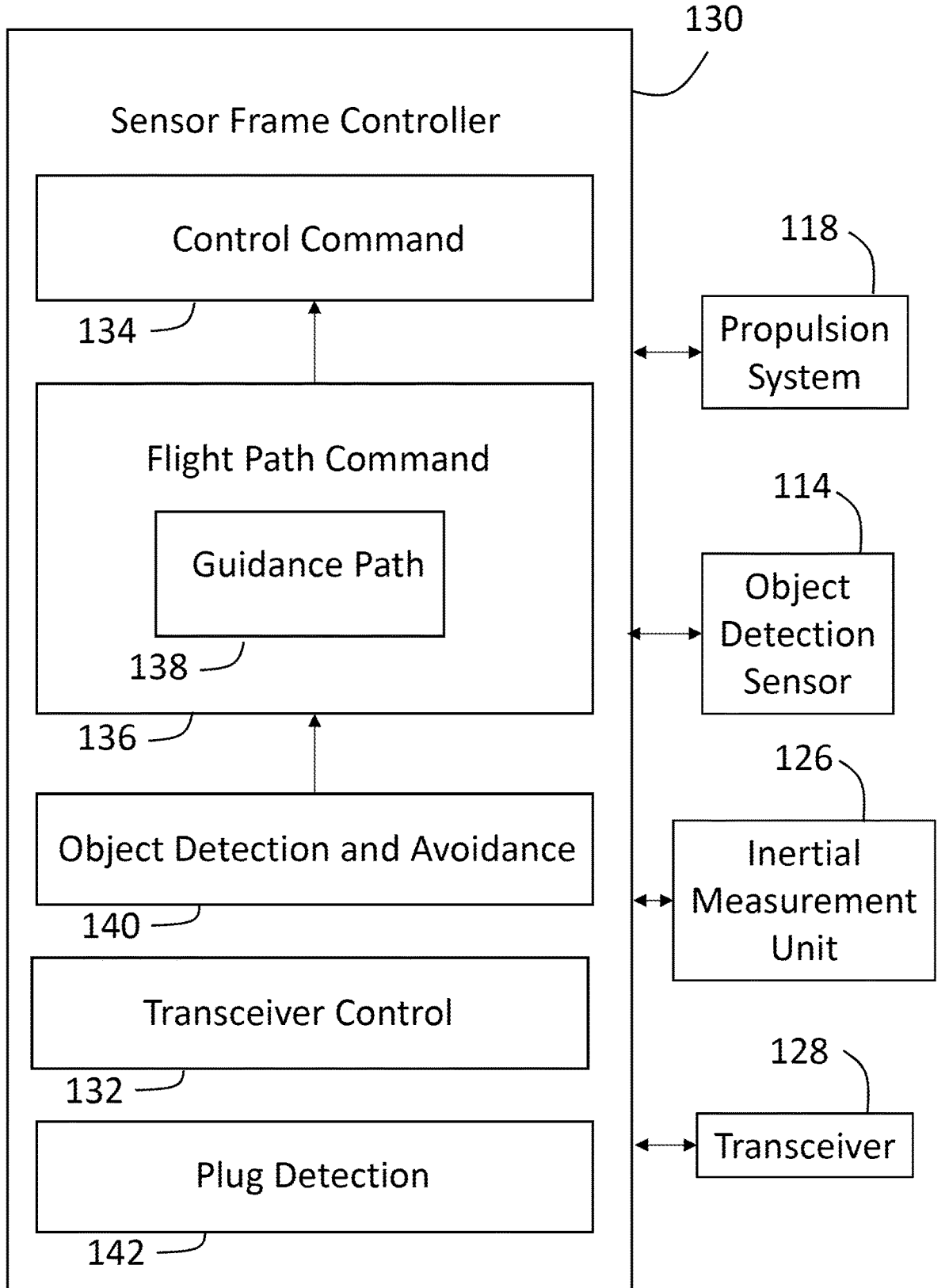
FIG. 4 illustrates a schematic of a sensor frame controller in accordance with aspects of the present subject matter, particularly illustrating various components of the sensor frame controller in accordance with aspects of the present subject matter.

The sensor frame controller 130 can be used to receive data and/or control the operation of any of various components of the autonomous sensor frame 112, including, but not limited to, the object detection sensor 114, the propulsion system 118, the inertial measurement unit 126, and the transceiver 128. One nonlimiting embodiment of the sensor frame controller 130 is illustrated in FIG. 4 which depicts a power and/or data relationship between the sensor frame controller 130 and various components of the autonomous sensor frame 112. FIG. 4 also depicts various capabilities of the sensor frame controller 130.

FIG. 4 is depicted as including double headed arrows between the sensor frame controller 130 and the various components in FIG. 4. It will be appreciated that the schematic is for ease of depiction only, and that the double headed arrows indicated that data and/or power communication is provided between the sensor frame controller 130 and the various components depicted. For example, the double headed arrow between the object detection sensor 114 and the sensor frame controller 130 can indicate that data is shared from the object detection sensor 114 to the sensor frame controller 130, and can also indicate that the sensor frame controller 130 is capable of commanding an operation of the object detection sensor 114. Power may be provided from the sensor frame controller 130 to the object detection sensor 114, but, in some embodiments, power may be provided through other systems (e.g., an energy storage system, such as a battery or the like). Thus, the double headed arrows indicate any of a variety of uni-direction or bi-directional communication between the sensor frame controller 130 and the various components depicted in FIG. 4, which can include either or both of data and power communication. Furthermore, although only one double headed arrow is depicted between the sensor frame controller 130 and the various components in FIG. 4, it will be appreciated that each double headed arrow can include multiple double headed arrows indicating either redundancy in the power and/or data communication, and/or multiple components are included in each separate component illustrated (e.g., multiple motors and propellers in the propulsion system 118 which are controlled by the sensor frame controller 130). Still further, power and/or data communication between the sensor frame controller 130 and any of the various components depicted in FIG. 4 can be via one or more power and/or data communication busses.

Also illustrated in FIG. 4 are various capabilities of the sensor frame controller 130. For example, the sensor frame controller 130 includes the capability to control the transceiver at 132. Such control can be by way of power management to the transceiver and/or formulation of excitation voltage to the transceiver. In other embodiments, the sensor frame controller 130 is structured to communicate data to the transceiver for transmission, with the transceiver 128 including necessary electronics to convert the data requested for transmission from the transceiver 128 to any necessary waveform for such transmission.

The sensor frame controller 130 also includes a control command at 134. The control command can be used to alter an operation of the propulsion system 118 of the illustrated embodiment, but can also include control commands to alter operation of control effectors associated with other types of flying platforms, such as, but not limited to, aileron and/or elevator commands of a fixed wing aircraft. Such control can be by way of power management to propulsion system 118 (e.g., separate power commands to each of the separate motors 120) and/or formulation of specific excitation voltage to the propulsion system 118. In other embodiments, the sensor frame controller 130 is structured to communicate data to the propulsion system 118, with the propulsion system 118 including necessary electronics to convert a control command from the sensor frame controller 130 to any necessary waveform for control of the propulsion system 118.

The sensor frame controller 130 also includes a flight path command 136 which may include a guidance path 138. The flight path command 136 can be formulated by the sensor frame controller 130 to achieve a trajectory of the autonomous sensor frame 112 through an airspace and/or relative to the agricultural machine 13. For example, if the autonomous sensor frame 112 receives, via the autonomous sensor frame transceiver 128, a position of the agricultural machine 13, then the sensor frame controller 130 can develop, based on its position through the inertial measurement unit 126 and/or GNSS signal, a flight path command useful to convey the autonomous sensor frame 112 from its current position to the position of the agricultural machine 13. The flight path command 136 can used to formulate the control command

134. In some embodiments, a guidance path 138 can be determined by the sensor frame controller 130 suitable for any given phase of flight for the autonomous sensor frame 112. For example, if formation flying of the autonomous sensor frame 112 is needed to inspect the agricultural machine 13 for a plugged condition 110, then a guidance path 138 can be formulated to position the autonomous sensor frame 112 with respect to the agricultural machine 13. In some situations, this may entail a guidance path 138 that shadows an implement 10 at a standoff distance and height to inspect any of the various components that can become fouled by an excessive accumulation of field materials (e.g., one or more of disc blades 46, shanks 50, wheels 42, blades 52, and/or basket assemblies 54). A guidance path could also include a formation flying using a changing position, such as a regularly repeating pattern of flight between the between first side 34 and the second side 36 of the implement 10, and then back again. A guidance path could also include a transition path from one formation flying task to another formation flying task. It is envisioned that formation flying can take place anywhere in altitude, but in some applications anywhere from about nine feet (e.g., 3 meters) to about 30 feet (e.g., 10 meters). Any of the flight path command 136 or the guidance path 138 can be determined based on a detection via data provided from the object detection sensor 114 of the location of the agricultural machine 13 relative to the autonomous sensor frame 112. For example, a guidance path 138 can be defined relative to the implement 10 to achieve a constant relative distance from a rear of the first side 34. Data from the object detection sensor 114 can be used to estimate a current position of the autonomous sensor frame 112 from the implement 10 and thereafter generate a flight path command to achieve the constant relative distance.

The sensor frame controller 130 also includes the object detection and avoidance at 140 that uses data provided from the object detection sensor 114 to aid in identifying obstacles. When the object detection and avoidance 140 detects an object to be avoided, it can relay that information elsewhere in the sensor frame controller 130 to alter the control command 134 and thereby change a trajectory of the autonomous sensor frame 112. For example, if an obstacle, such as a fence, is detected, the object detection and avoidance 140 can provide information regarding the fence (e.g., location of the fence relative to the autonomous sensor frame 112) to the flight path command 136 to alter a commanded flight path, which cascades to a change in the control command 134. In other embodiments, however, identification of an upcoming obstacle could be provided direct to the control command 134 for immediate action, such as an "abort to higher altitude" command.

The sensor frame controller 130 also includes plug detection at 142 useful to identify a plugged condition based on data provided from the object detection sensor 114. As will be appreciated from the discussion herein, multiple object detection sensors 114 can be provided and used not only for the object detection and avoidance 140 but also for the plug detection 142. In fact, in some embodiments, multiple different object detection sensors 114 are used for plug detection 142. In this regard, different object detection sensors 114 can be used in conjunction with one another to identify and/or confirm that a plugged condition 110 is present. For example, a LiDAR system and a radar system can be used to confirm the presence of a plugged condition 110 in any of the components of the implement 10. In some embodiments, the sensor frame controller 130 can include a computer aided drafting (CAD) model of the agricultural machine from which a differencing algorithm can be used to compare data from either or both of the LiDAR and radar to determine if a plugged condition 110 is present. Such direct observation of a plugged condition 110 is contemplated using any of the object detection sensors 114, and it is also contemplated that indirect observations of a plugged condition 110 can be made via the autonomous sensor frame 112. For example, images taken of a field immediately behind the implement 10 can be used to infer a plugged condition. If data received from the object detection sensor 114 indicate an uneven residue distribution of field materials, then such data can indirectly indicate a plugged condition. Images from a non-plugged state can be compared to current data from the object detection sensor 114 through a differencing to determine that a trough is wider and/or deeper than typical. To set forth just one non-limiting example of a differencing between current data and images from a non-plugged state, images from a camera can be compared to determine changes in the images. The sensor frame controller 130 can be configured to determine that a plugged condition is met if the difference between a non-plugged condition and the current condition satisfy a predetermined threshold (e.g., the different is at or above a threshold). In other embodiments, data from the object detection sensor can be used to assess the area immediately behind the implement 10 and estimate the size of a trough. Whether the measurements are direct or indirect, the plug detection 142 can formulate data indicative of a plugged condition 110 in any number of useful manners. For example, the plug detection 142 can generate data indicating a plugged condition 110 along a continuum from 0% to 100%, which continuum can represent either a confidence of a plugged condition or a severity of a plugged condition. The data indicative of a plugged condition 110 can include, or be derived from, the threshold determination from the differencing technique described above, the estimation of the size of a trough, etc. In some embodiments, the data can include both confidence and severity. Additionally and/or alternatively, the data indicative of the plugged condition can represent a location identifier of which component and/or where the plugged condition is present (e.g., left side or right side, between discs, in a basket, etc.). Upon determination that a plugged condition 110 is present, the sensor frame controller 130 can communicate such data to the agricultural machine 13 via the transceiver 128.

Figure 5:
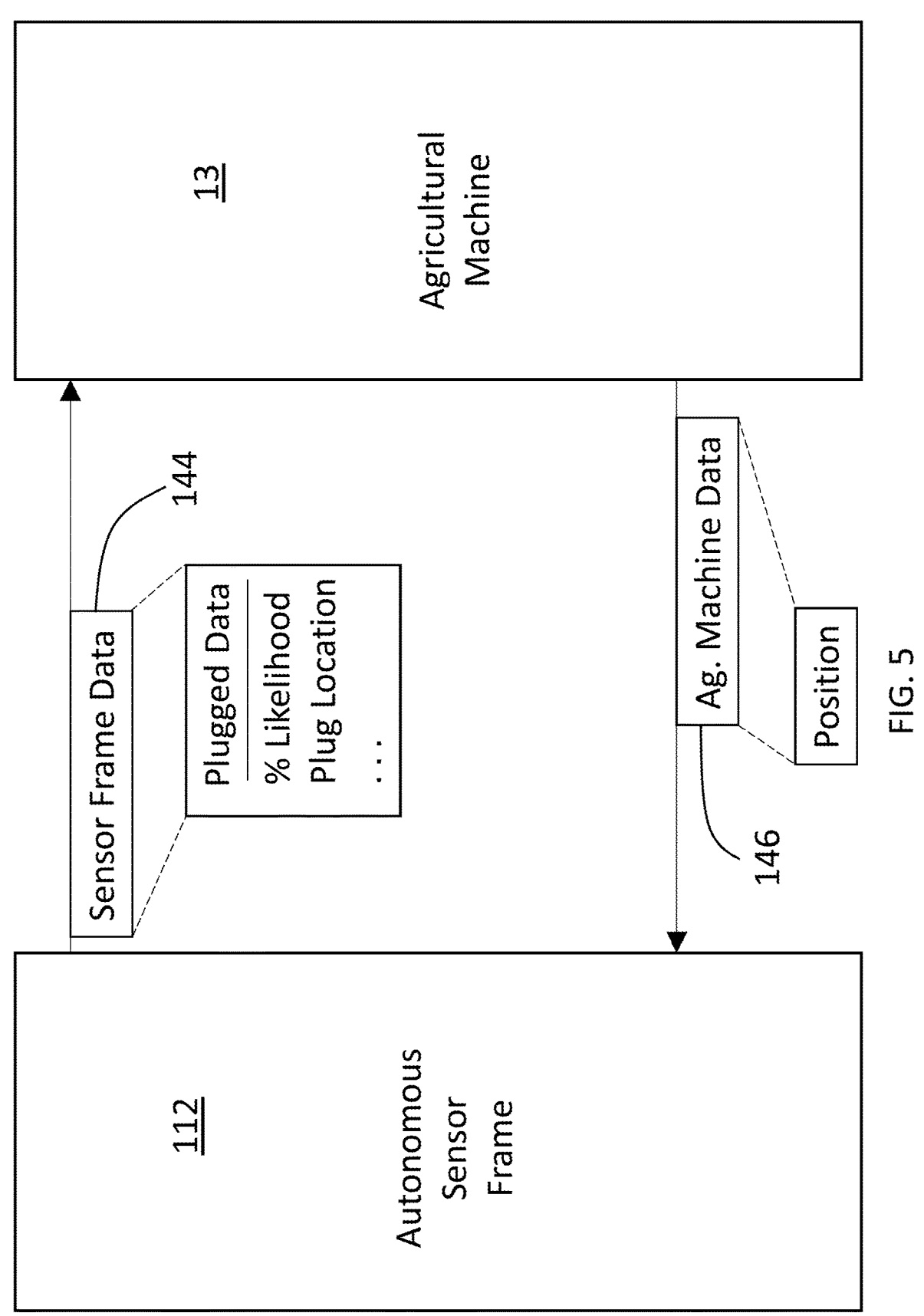
FIG. 5 illustrates a bi-directional communication between the autonomous sensor frame and the agricultural machine in accordance with aspects of the present subject matter.

Turning now to FIG. 5, an embodiment of bi-directional communication between the autonomous sensor frame 112 and agricultural machine 13 is depicted. The autonomous sensor frame 112, through use of the sensor frame controller 113 and autonomous sensor frame transceiver 128 can transmit sensor frame data 144 which is received by the agricultural machine 13. Sensor frame data 144 can include any of the data, either measured, estimated, or controlled, discussed above related to operation of the autonomous sensor frame 112. As indicated in FIG. 5, such data can include plugged data which includes any number of indications of a plugged condition, such as, but not limited to, the likelihood of a plugged condition as well as a location of a plug discussed above. Other data are also contemplated. Other information can also be included in the sensor frame data 144. The agricultural machine 13, through use of the agricultural machine transceiver 29, can transmit agricultural machine data 146 which is received by the autonomous sensor frame 112. Agricultural machine data 146 can include any of the data discussed above related to operation of the agricultural machine 13. As indicated in FIG. 5, such data can include a position of the agricultural machine 13 determined using, for example, a GNSS system, such as GPS, using an antenna on the agricultural machine 13. Other information can also be included in the agricultural machine data 146.

In some embodiments of the system described herein, the autonomous sensor frame 112 can be tasked by the agricultural machine 13, or perhaps a central operating station, to fly alongside the agricultural machine 13 for a time, then be re-tasked to fly alongside a different agricultural machine 13 for another period of time. Communication hand-offs can occur such as through transmission of agricultural machine data 146 to alert the autonomous sensor frame 112 to a change in task order with a position of another agricultural machine data 146 for the autonomous sensor frame 112 to fly toward. Enroute the autonomous sensor frame 112 can establish bi-directional communication with the other agricultural machine 13 for subsequent notification of sensor frame data 144 related to that particular agricultural machine 13.

As will be appreciated from the discussion above, if the agricultural machine 13 receives sensor frame data 144 indicating a plugged condition via the plugged data transmitted to it, the agricultural machine 13 can take action to begin to clear the plugged condition. For example, the agricultural machine controller 27 can command the engine 24 to reduce power output and thereby reduce speed of the agricultural machine 13 to a halt so that an operator can tend to the plugged condition if the likelihood and/or severity of a plugged condition reported in the sensor frame data exceeds a threshold. In other embodiments, upon receipt of the sensor frame data 144 indicating a plugged condition, a display action can be initiated in the cab 22 in an embodiment in which an operator is occupying the cab. A display action can include illumination of a light inside the cab, projection of an indication on a display in the cab 22, or excitation of an audible alarm. Such display can alert the operator to the need to halt operation of the agricultural machine 13 to clear the plugged condition.

Figure 6:
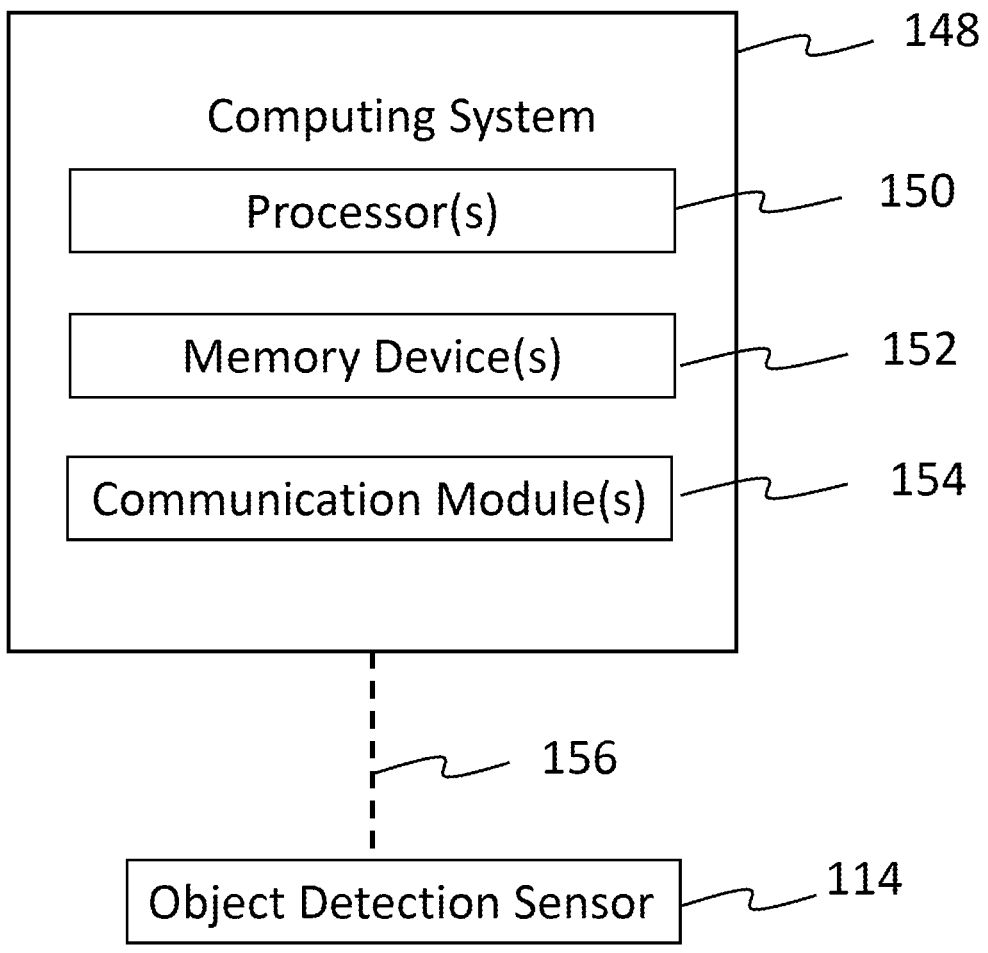
FIG. 6 illustrates a schematic of one embodiment of a computing device in accordance with aspects of the present subject matter.

Referring now to FIG. 6, embodiments of the systems and methods disclosed herein may include a computing system 148 communicatively coupled to components of the autonomous sensor frame 112, such as, but not limited to, the object detection sensor 114. The embodiment depicted in FIG. 6 will reference communication between the computing system 148 and the object detection sensor 114, but it will be appreciated that the computing system 148 can be communicatively coupled to other components as well. The computing system 148 depicted in FIG. 6 can be the sensor frame controller 130 described and depicted above, but it will be appreciated that other components can take the form of the computing system 148 depicted in FIG. 6. Thus, any reference herein with respect to the computing system 148 can apply to any of the systems and components of the autonomous sensor frame 112 discussed above, as well as the agricultural machine controller 27 and/or agricultural machine transceiver 29.

In general, the computing system 148 may include suitable algorithms, mathematical formulas or expressions, predetermination relationships, correlation tables, look-up tables, and/or other data stored within its memory that allows the computing system 148 to determine, calculate, or estimate any data associated with operation of any of the systems and components of the autonomous sensor frame 112 and/or various of the agricultural machine 13, such as, but not limited to, the agricultural machine controller 27 or the agricultural machine transceiver 29.

In general, the computing system 148 may comprise any suitable processor-based device known in the art, such as a computing device or any suitable combination of computing devices. Thus, in several embodiments, the computing system 148 may include one or more processor(s) 150 and associated memory device(s) 152 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 152 of the computing system 148 may generally comprise memory element(s), including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 152 may generally be configured to store suitable computer-readable instructions that, when implemented by the processor(s) 150, configure the computing system 148 to perform various computer-implemented functions, such as one or more aspects of the methods or algorithms described herein. In addition, the computing system 148 may also include various other suitable components, such as a communications circuit or module, one or more input/output channels, a data/control bus and/or the like. For instance, the computing system 148 may include a communications module or interface 154 to allow the computing system 148 to communicate via 156 with any of the various other system components described herein, such as, but not limited to, the object detection sensor 114.

It should be appreciated that in some embodiments, the computing system 148 may correspond to or form part of an existing on-board computing system, such as the on-board computing system of the work vehicle 12 (e.g., agricultural machine controller depicted in FIG. 1).

Turning now to FIG. 7, a flow diagram of one embodiment of a method for operating an agricultural surveillance system. In general, the method 158 will be described herein with reference to autonomous sensor frame 112 and agricultural machine 13 described and depicted in FIGS. 1-3. However, it should be appreciated by those of ordinary skill in the art that the disclosed method 158 may generally be implemented with any agricultural machine 13 having any suitable implement configuration and any autonomous sensor frame 112 having any suitable configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at step 160, the method 158, may include formation flying an autonomous sensor frame based on an agricultural machine. At step 162, the method may further include capturing an image scene with an object detection sensor and generating scene data representing the image scene, the image scene including at least part of the agricultural machine. At step 164, the method may further include generating sensor frame data from the autonomous sensor frame that includes plugged data indicative of a plugged operating condition of the agricultural machine, the plugged data based on the scene data. At step 166, the method 50 may still further include transmitting the sensor frame data that includes the plugged data from the autonomous sensor frame to the agricultural machine. At step 168, the method 50 may still further include altering a state of operation of the agricultural machine based on the plugged data.

It is to be understood that the steps of the method 158 are performed by the computing system 148 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 148 described herein, such as the method 158, is implemented in software code or instructions which are tangibly stored on a tangible computer readable medium. The computing system 148 loads the software code or instructions via a direct interface with the computer readable medium or via a wired and/or wireless network. Upon loading and executing such software code or instructions by the computing system 148, the computing system 148 may perform any of the functionality of the computing system 148 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural surveillance platform useful to identify an operating condition of an agricultural machine, the agricultural surveillance platform comprising:

an autonomous sensor frame structured to fly in formation with an agricultural machine and detect an operating condition of the agricultural machine, the autonomous sensor frame having:

a propulsion system structured to provide propulsive power to the autonomous sensor frame;

an inertial measurement unit configured to generate flight data measurements;

an object detection sensor affixed to the autonomous sensor frame and having a field of view sized to capture an image scene that includes a ground-engaging tool of the agricultural machine, the object detection sensor structured to generate scene data representing the image scene; and a sensor frame controller configured to:

receive the flight data measurements;

receive the scene data;

generate a control command based at least in part on a relative orientation of the agricultural machine identified in the scene data and the flight data measurements, the control command being useful to modulate the propulsion system and maintain a position of the autonomous sensor frame about the ground-engaging tool of the agricultural machine; and generate autonomous sensor frame data based at least in part on the scene data, the autonomous sensor frame data including plugged data indicative of a plugged operating condition of the ground-engaging tool of the agricultural machine.

2. The agricultural surveillance platform of claim 1, wherein the plugged data includes data associated with a likelihood of the plugged operating condition.

3. The agricultural surveillance platform of claim 1, wherein the sensor frame controller is configured to generate the plugged data by:

identifying an implement of the agricultural machine in the scene data having the ground-engaging tool;

comparing a current condition of the implement identified in the scene data to a baseline condition for the implement; and generating the plugged data indicative of the plugged operating condition of the agricultural machine when the current condition of the implement identified in the scene data differs by a predetermined threshold from the baseline condition for the implement.

4. The agricultural surveillance platform of claim 3, wherein the plugged data includes an indication of at least one of a confidence of the plugged operating condition or a severity of the plugged operating condition based at least in part on a difference between the current condition of the implement and the baseline condition for the implement.

5. The agricultural surveillance platform of claim 1, wherein the sensor frame controller is further structured to receive agricultural machine data indicative of a global position of the agricultural machine, wherein the sensor frame controller is structured to generate the control command further based at least in part on the global position of the agricultural machine.

6. The agricultural surveillance platform of claim 1, wherein the sensor frame controller is structured to generate a flight path command based on the relative orientation of the agricultural machine identified in the scene data, the flight path command being configured to guide the autonomous sensor frame from its current position to a different position relative to the agricultural machine.

7. The agricultural surveillance platform of claim 6, wherein the flight path command is further based on a guidance flight path, the guidance flight path defining a standoff distance and height to be maintained by the autonomous sensor frame relative to the agricultural machine.

8. The agricultural surveillance platform of claim 6, wherein the flight path command is further based on a guidance flight path, the guidance flight path defining a regularly repeating pattern for switching between monitoring a first side of the agricultural machine and a second side of the agricultural machine along a lateral direction.

9. The agricultural surveillance platform of claim 1, wherein the sensor frame controller is configured to generate the plugged data by:

identifying an area immediately behind at least a portion of the agricultural machine including the ground-engaging tool in the scene data;

comparing a current condition in the area identified in the scene data to a baseline condition; and generating the plugged data indicative of the plugged operating condition of the agricultural machine when the current condition differs by a predetermined threshold from the baseline condition.

10. The agricultural surveillance platform of claim 1, wherein the sensor frame controller is further configured to receive an input from an operator associated with needing to inspect the ground-engaging tool, wherein the sensor frame controller is configured to generate the control command further based at least in part on the input from the operator.

11. An agricultural surveillance system comprising:

an agricultural machine configured to work soil, the agricultural machine comprising:

an agricultural machine controller configured to control a state of operation of the agricultural machine; and an autonomous sensor frame configured to navigate around the agricultural machine, the autonomous sensor frame including:

a propulsion system for providing propulsive power to the autonomous sensor frame;

an object detection sensor having a field of view sized to capture an image scene that includes a ground-engaging tool of the agricultural machine, the object detection sensor structured to generate a scene data representing the image scene;

a sensor frame controller configured to:

receive the scene data;

generate a flight path command for controlling the propulsion system based at least in part on a relative orientation of the agricultural machine identified in the scene data; and generate an autonomous sensor frame data that includes a plugged data indicative of a plugged operating condition of the ground-engaging tool of the agricultural machine based at least in part on the scene data, wherein the agricultural machine controller is configured to alter the state of operation of the agricultural machine based on the plugged operating condition of the ground-engaging tool of the agricultural machine.

12. The agricultural surveillance system of claim 11, wherein the sensor frame controller generates the flight path command based further at least in part on position data from the agricultural machine to change a position of the autonomous sensor frame to rendezvous with the agricultural machine, the position data from the agricultural machine being indicative of a global position of the agricultural machine.

13. The agricultural surveillance system of claim 11, wherein the object detection sensor is affixed to a gimballed platform structured to move relative to the autonomous sensor frame.

14. The agricultural surveillance system of claim 11, wherein the sensor frame controller includes an object avoidance controller structured to generate an object avoidance control command based on the scene data.

15. The agricultural surveillance system of claim 11, wherein the plugged data includes an indication of a source of a plug.

16. The agricultural surveillance system of claim 11, wherein the agricultural machine comprises an implement frame extending laterally between a first side and a second side, the implement frame being configured to support a plurality of ground-engaging tools configured to engage the field, wherein the plugged data includes an indication of the plugged operating condition being on the first side or the second side.

17. A method of operating an agricultural surveillance system, the method comprising:

formation flying an autonomous sensor frame based on an agricultural machine;

capturing an image scene with an object detection sensor supported on the autonomous sensor frame and generating scene data representing the image scene, the image scene including at least part of the agricultural machine including a ground-engaging tool;

generating a flight path command for controlling a propulsion system of the autonomous sensor frame based at least in part on a relative orientation of the agricultural machine identified in the scene data;

generating sensor frame data from the autonomous sensor frame that includes plugged data indicative of a plugged operating condition of the ground-engaging tool of the agricultural machine, the plugged data being determined based at least in part on the scene data; and altering a state of operation of the agricultural machine based on the plugged operating condition of the ground-engaging tool of the agricultural machine.

18. The method of claim 17, further comprising, prior to the formation flying, transmitting a global position of the agricultural machine from the agricultural machine to the autonomous sensor frame, wherein formation flying of the autonomous sensor frame comprises formation flying the autonomous sensor frame based at least in part on the global position of the agricultural machine.

19. The method of claim 17, wherein the formation flying includes flying the autonomous sensor frame behind an implement of the agricultural machine.

20. The method of claim 19, wherein the scene data includes a residue distribution behind the implement, the plugged data being determined based at least in part on the residue distribution.

* * * * *